Feb. 20, 1923.
A. L. MULKEY
1,446,200
PROCESS FOR MAKING WHOLE WHEAT CEREAL FOODS
Filed Mar. 2, 1922
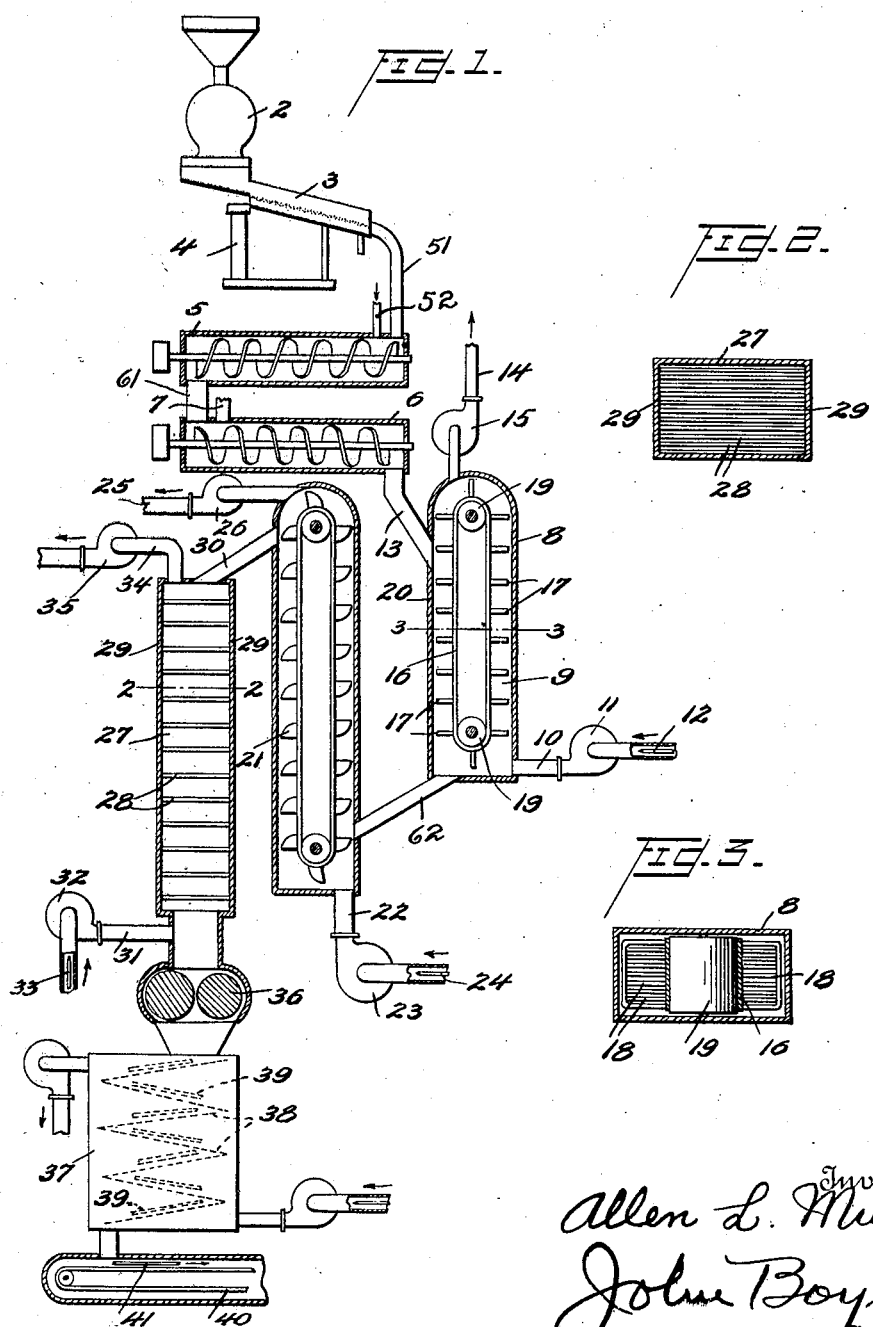
Inventor
Allen L. Mulkey
John Boyl
Attorney Patented Feb. 20, 1923.

1,446,200

UNITED STATES PATENT OFFICE.

ALLEN L. MULKEY, OF SEATTLE, WASHINGTON.

PROCESS FOR MAKING WHOLE-WHEAT CEREAL FOODS.

Application filed March 2, 1922. Serial No. 540,470.

*To all whom it may concern:*

Be it known that I, ALLEN L. MULKEY, citizen of the United States, residing at Seattle, in the county of King and State of Washington, have invented certain new and useful Improvements in Processes for Making Whole-Wheat Cereal Foods, of which the following is a specification.

My invention relates to a process of making cooked or toasted cereal foods, and one of the objects of the invention is to devise such a process in which such foods can be made out of whole wheat in the form of grits, granules, flakes, crumbles or any of the well known particles. In order to more clearly understand the process of producing the same, reference is to be had to the accompanying drawing in which is shown a layout of a mill suitable for carrying out the process. It will be understood that the process is susceptible of being carried out by various types of machines and the specific embodiment illustrated and described herein is only indicative of the principle of the invention; however, this specific embodiment is one which has been found to be practical in its construction and operation.

In the drawings,

Fig. 1 is a vertical section showing the layout of the mill,

Fig. 2 is a horizontal section on the line 2—2 of Fig. 1, and

Fig. 3 is a horizontal section on the line 3—3 of Fig. 1.

Wheat of the character specified is crushed in the crusher 2, each kernel being divided into approximately 2 to 6 parts. The crushed wheat is then passed over a sieve 3 to remove the dust which falls into the scalper 4. The oversize is then fed through the duct 51 to a steam conveyor 5 where it is wet cooked say from 3 to 10 minutes at a temperature of approximately 175–225 degrees F. Thereafter the grain is passed to a second steam conveyor 6 through the duct 61, where it is further cooked and where a suitable quantity of sugar or other flavoring may be introduced thereinto as at 7 for sweetening or otherwise flavoring the same to the desired taste of the finished product. When the sugar or flavoring is introduced into the second cooker, the grain is in the desired condition of softness so that it will readily absorb the same. Steam for cooking the grain is conducted to the conveyors through the pipe 52. Generally speaking, the steps of crushing and cooking are conventional and any suitable means for attaining this end might be readily utilized.

After the grain has been thoroughly cooked. if it is massed together in this condition it will have a tendency to ball up on account of the stickiness of the contained gluten, and cannot be successfully treated, without the interposition of my invention, to make a flake or grit or similar particle. Accordingly, I submit the grains to a process of partial dehydration and light working with the object in view of keeping the grains separate from each other and also permitting the gluten in the grains to expand. For carrying out this essential step in my process, I may use a type and arrangement of apparatus as hereinafter particularly described although other arrangements and types might readily be devised to accomplish the same end.

The grain having been cooked in the conveyor 6 is passed through the pipe 13 to the dehydrator 8, which consists of a chamber 9, having an entrance 10 for hot air, forced thereinto by the fan 11 after being suitably heated by the gas or electric heater 12. The moist air leaves the dehydrator through a pipe 14, sucked out by means of a fan 15. Within the chamber 9 is an endless belt 16 carrying spaced screens 17 and which may be formed of spaced bars 18. The endless belt is mounted on rotating pulleys 19, the direction being such that the screens on the side 20 are travelling vertically. The grain entering through the pipe 13 falls on the upwardly moving screens and slowly drops through one screen onto the screen below. The result is first; that the grains are separated and subjected to the dehydrating effect for a continued period of time; 2nd, that as the grains drop from one sieve to the next, they are subjected to a falling impact or slight pounding or light working action, the effect of which is to cause the gluten in the grain to expand. To illustrate more specifically the effect of light working of the grain in its moist cooked condition, if such grains are placed on a flat surface and lightly worked with the fingers, the grain will thereafter be larger due to the expansion of the gluten.

After the grain has left the dehydrator 8, it is fed through the duct 62 onto an elevator 21 and further dehydrated by a column of ascending heated air forced through the pipe 22, by the fan 23, and heated by the heater 24, the moist air being sucked out of the exit pipe 25 by the fan 26.

The grain is again subjected to further dehydration and working in the dehydrator 27. In this dehydrator, the screens 28 are stationary, being secured to the vertical sides 29. The grain is fed into the top of this dehydrator through the pipe 30, and falls step by step from one screen shelf to a lower one. Air is forced into the bottom through the pipe 31 by the fan 32, and heated by the heater 33. The moist air is drawn out at the top through the pipe 34 by the suction fan 35.

The amount of moisture that is in the final product can be varied by the temperature of the incoming air. The speed of descent of the grains may also be regulated by the velocity of the rising air current.

The partially dehydrated and enlarged grains may thereafter be used in a number of different ways. They may be used directly as food without further treatment; or they may be toasted to make what are known as grits. When it is desired to make flakes or crumbles, the grain may be fed to flaking rolls 36, and then to the shaker toaster 37, which may be provided with shaking screens 38, having overlying heaters 39. Thereafter the grain may be fed to the conveyor 40 having a suitable overlying heater 41.

The flakes as they come from the flaking rolls may be made in the form of biscuits or wafers by pressing them into molds of the desired shape and then baking or toasting.

Variations in the amount of moisture retained in the partially dehydrated grains will produce variations in the physical characteristics of the final product; i. e. more moisture will be present when it is desired to make crumbles rather than flakes. Other means of toasting the flakes may be employed than that shown, such as hot oil or dry heat.

It will be understood that the key to the whole process consists in preventing sticking together of the grains of wheat, this being done by partial dehydration of the grain, leaving it sufficiently plastic for subsequent shaping operations. To improve the character of the finished product, it is lightly worked to secure expansion of the gluten.

From the above description, it will be apparent that I have produced a process of the character described, which will successfully make the desired product, and while I have set forth particular steps or sequence of steps for attaining the desired end, I do not intend to so limit myself, and it will be understood that I reserve the right to all changes properly falling within the spirit and scope of the appended claims.

Therefore what I claim as new and desire to secure by Letters Patent is:

1. The process of making cereal foods from wheat comprising crushing the grain, wet cooking it and thereafter maintaining the particles separate from each other by dehydration.

2. The process of making cereal foods from wheat comprising crushing the grain, wet cooking it and then partially dehydrating and working the particles.

3. The process of making cereal foods from wheat, comprising crushing the grain, wet cooking it, then screening it to separate the particles and while in this condition dehydrating them.

4. The process of making cereal foods from wheat comprising crushing the grain, wet cooking it, then screening it to separate the particles and while in this condition partially dehydrating and working them.

5. The process of making cereal foods from wheat comprising crushing the grain, wet cooking it and then subjecting the particles to light working to expand the gluten contents.

6. The process of making cereal foods from wheat comprising crushing the grain, wet cooking it and then dropping the particles through a column of dehydrating air and interrupting their descent by spaced interposed barriers.

7. The process of making cereal foods from wheat comprising crushing the grain, wet cooking it and then dropping the particles through a column of dehydrating air and separating and interrupting their descent by spaced screens.

8. The process of making wheat flakes comprising crushing the grain, wet cooking it and then expanding the gluten content of the particles by subjecting them to light working by falling impact.

9. The process of making cereal foods from wheat comprising crushing the grain, wet cooking it until it becomes glutinous, mechanically separating the individual particles and dehydrating them to retain them in their separated condition.

10. The process of making cereal foods from wheat comprising crushing the grain, wet cooking it until it becomes glutinous, mechanically separating the individual particles, dehydrating them to retain them in their separated condition, and then working them to expand the gluten contents.

11. The process of making cereal foods from wheat comprising crushing the grain, wet cooking it until it becomes glutinous, mechanically separating the individual particles, partially dehydrating them so that they will remain plastic and in their separated condition and thereafter forming the said particles into flakes.

In testimony whereof I affix my signature.

ALLEN L. MULKEY.